Sept. 9, 1958
L. R. BUCKENDALE
2,851,115
VEHICLE DRIVE MECHANISM AUTOMATICALLY DIRECTING
POWER TO SLOWER ROTATING
Filed Dec. 21, 1950
6 Sheets—Sheet 1
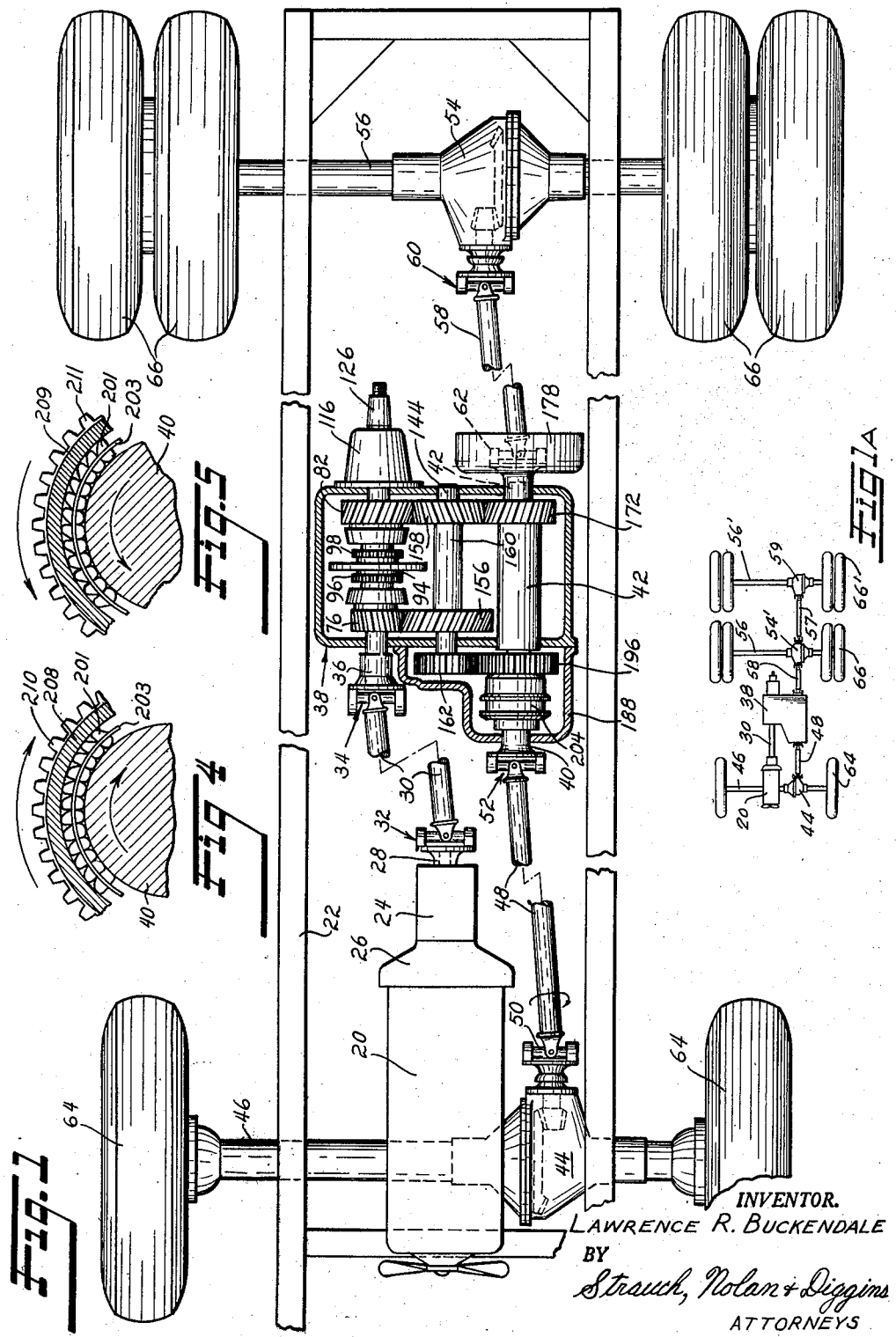
INVENTOR.
LAWRENCE R. BUCKENDALE
BY
Strauch, Nolan + Diggins
ATTORNEYS

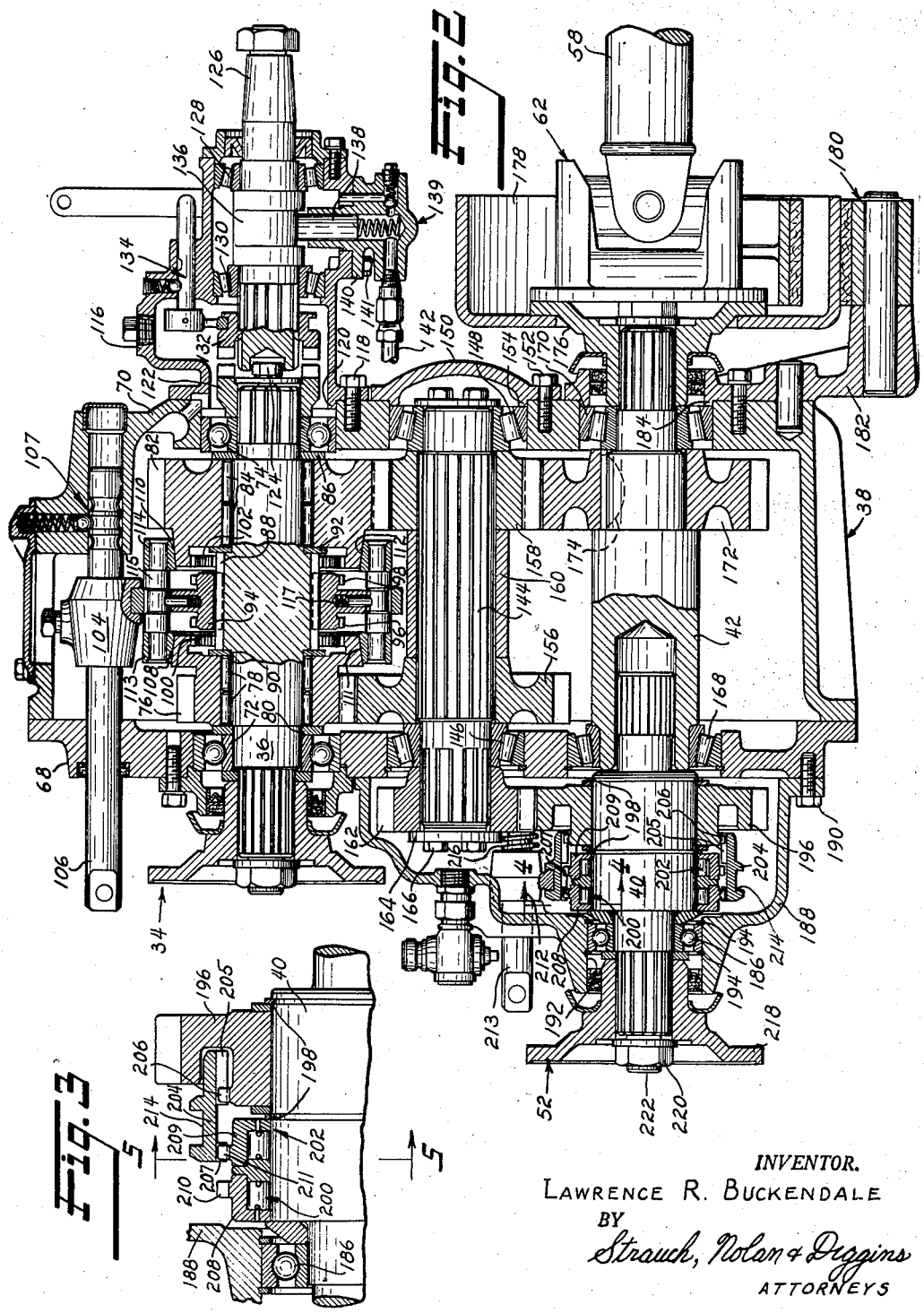

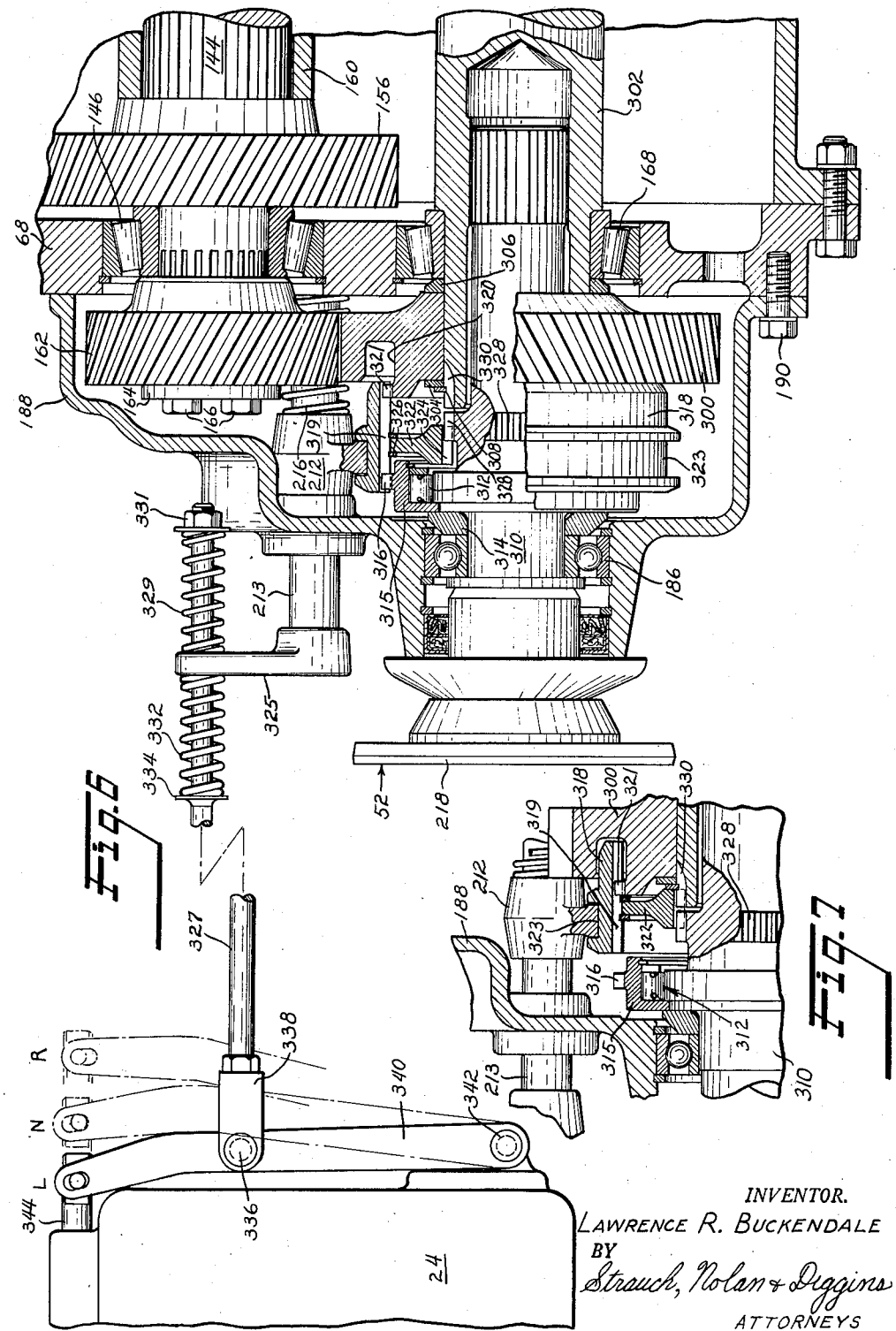

Sept. 9, 1958  L. R. BUCKENDALE  2,851,115
VEHICLE DRIVE MECHANISM AUTOMATICALLY DIRECTING
POWER TO SLOWER ROTATING
Filed Dec. 21, 1950  6 Sheets-Sheet 4
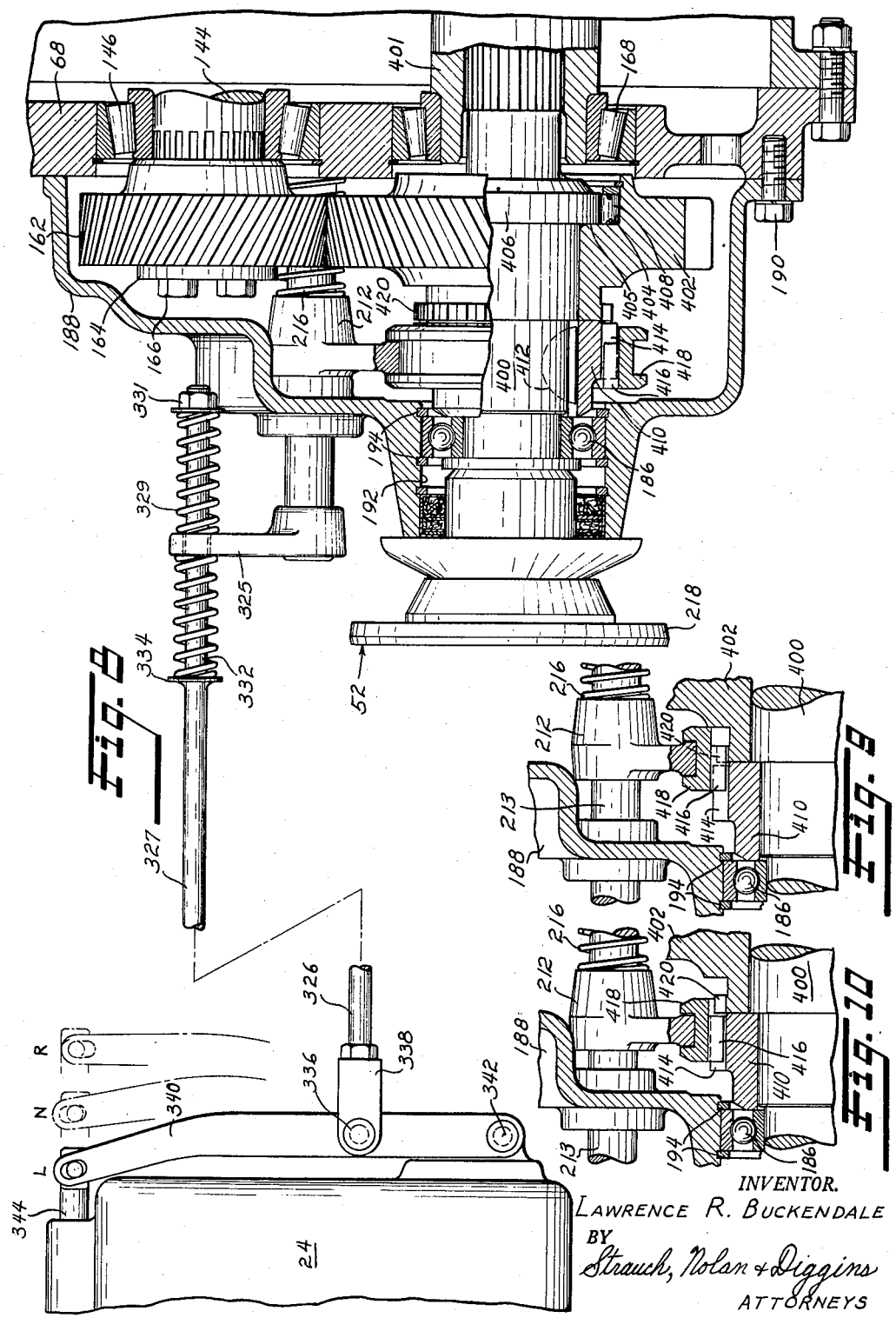
INVENTOR.
LAWRENCE R. BUCKENDALE
BY
Strauch, Nolan & Diggins
ATTORNEYS

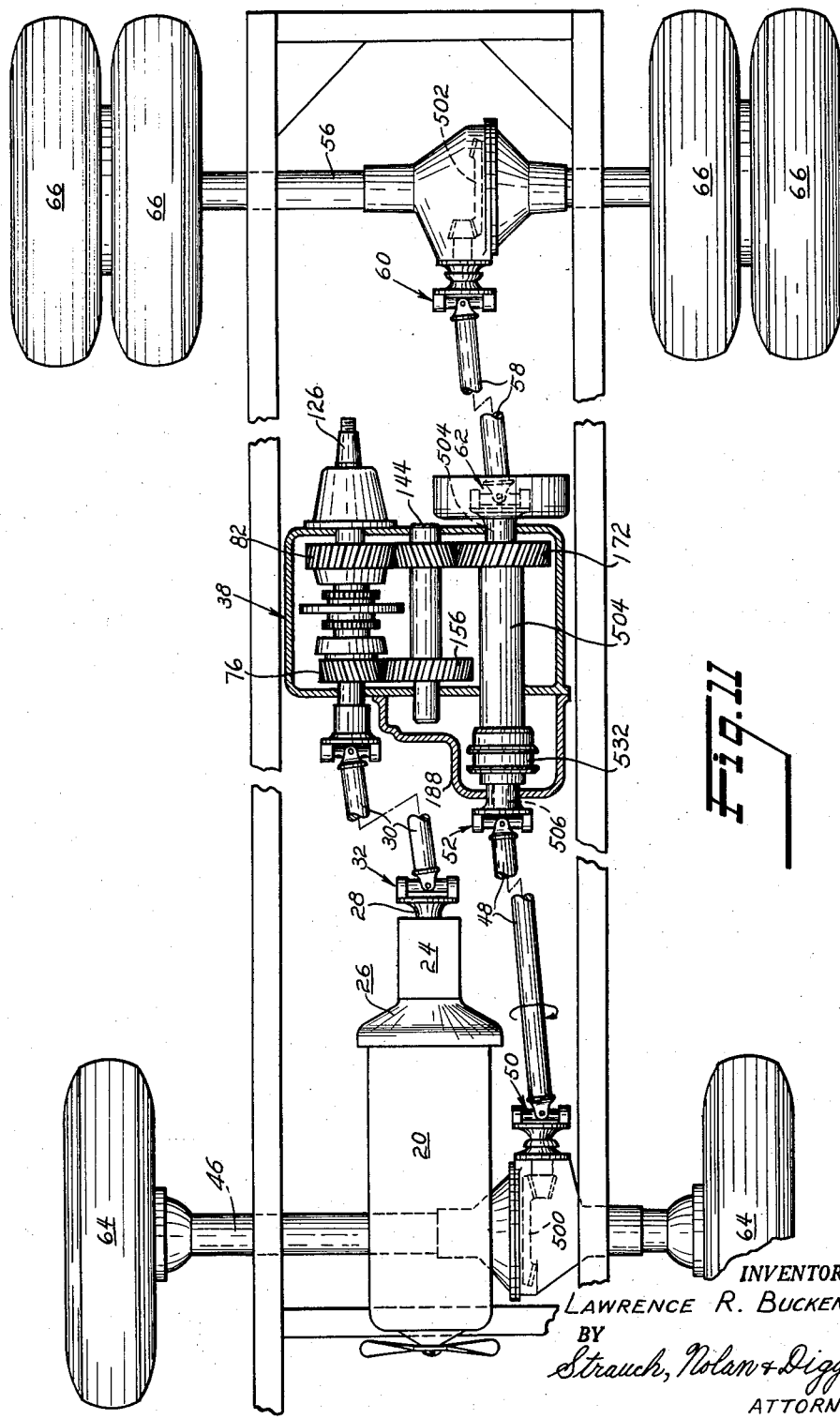

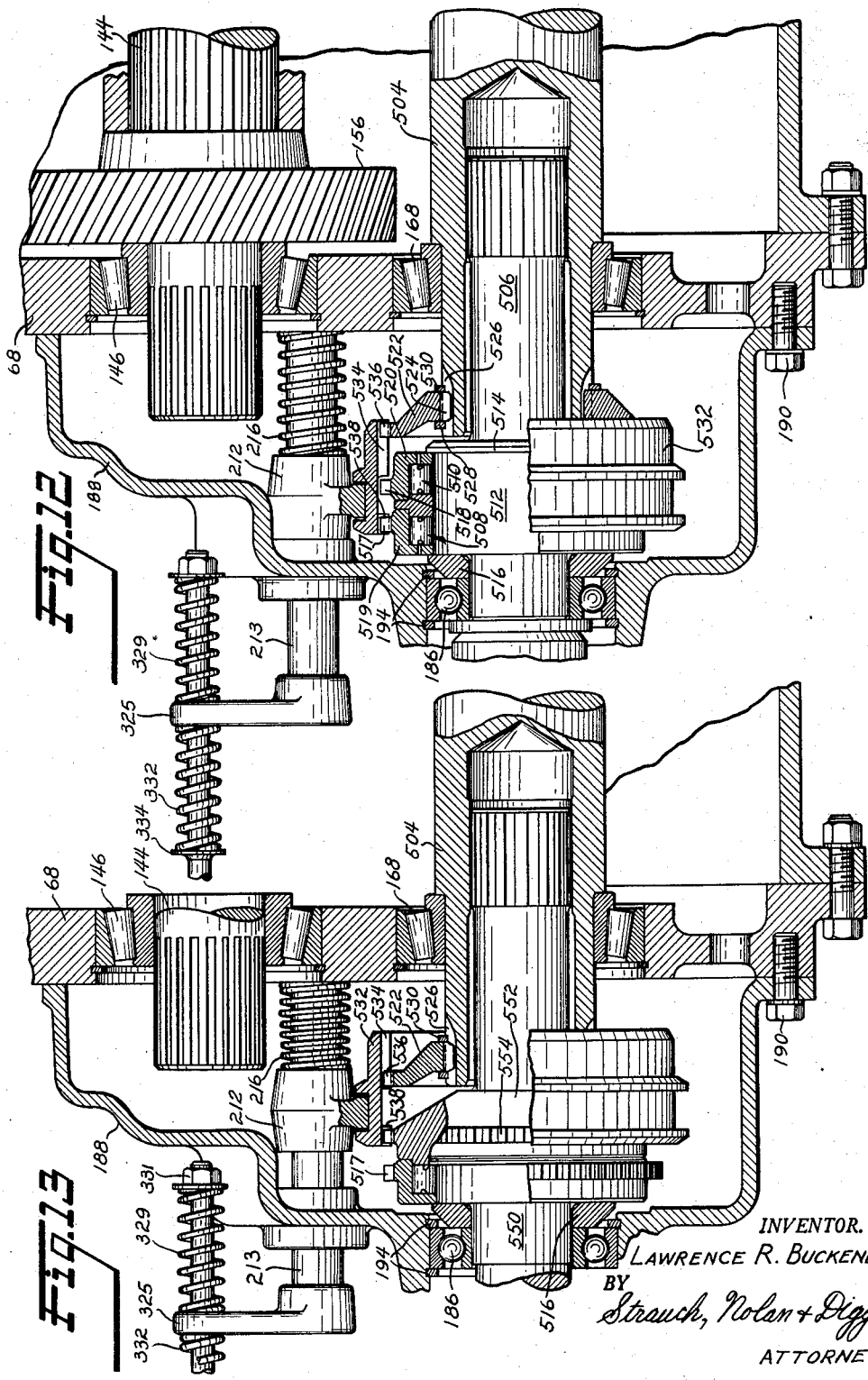

United States Patent Office 2,851,115
Patented Sept. 9, 1958

2,851,115

VEHICLE DRIVE MECHANISM AUTOMATICALLY DIRECTING POWER TO SLOWER ROTATING

Lawrence R. Buckendale, Detroit, Mich., assignor, by mesne assignments, to Rockwell Spring and Axle Company, Coraopolis, Pa., a corporation of Pennsylvania Application December 21, 1950, Serial No. 202,103

12 Claims. (Cl. 180—23)

This invention relates generally to multi-axle driven vehicles and more specifically to vehicles having a set of ground engaging wheels that are driven only when the usually propelling wheels lose a predetermined percentage of their traction.

Experience has proved that the conventional drive arrangements for multi-axle driven vehicles are often unsatisfactory, especially for military vehicles. If an interaxle differential is used, all of the driving torque may run out of one axle if the propelling wheels of that axle lose their traction. If the axles are directly connected together a driving interference is generally set up between them due to slight differences in their tire diameters. These slight diameter differentials may results from unequal tire wear or improper tire inflation.

Drive arrangements have been used wherein a second axle may be manually engaged when the operator deems additional traction is needed. In such arrangements since the movement of the vehicle must be halted before the engagement of the second drive axle may be made, the advantage of momentum is lost and the vehicle may consequently become mired.

Certain efforts have been made in the part to provide a drive mechanism for a multi-axle driven vehicle in which an auxiliary axle is automatically engaged when the primary drive wheels lose traction. An example of such a mechanism is that disclosed in United States Patent No. 1,738,212, issued December 3, 1929, to H. W. Smith. In the device disclosed by Smith, since the drive mechanism is adapted to drive both the primary and auxiliary drive axles at the same speed, it is necessary to provide tires of slightly smaller diameter for the auxiliary drive wheels than for the primary drive wheels in order to maintain the auxiliary drive axle disengaged from the drive mechanism under normal traction conditions. The practical utility of such a mechanism is limited by the fact that tires wear unequally and are not at all times maintained at the proper degree of inflation.

The limitations and disadvantages of the prior art are overcome by this invention in which drive trains are provided for the primary and auxiliary drive wheels which are adapted to drive the primary drive wheels at a speed greater than the driven speed of auxiliary drive wheels, the auxiliary drive train being inoperative to drive the auxiliary drive wheels so long as traction of the primary drive wheels is maintained due to the free wheeling of the auxiliary drive wheels, but being automatically rendered operative upon loss of traction of the primary drive wheels. Since the auxiliary drive train is maintained in its inoperative condition due to the difference in speed at which the two sets of drive wheels are adapted to be driven, the function of the drive is not dependent upon the tire size nor upon other variable conditions difficult to control.

It is therefore the major object of this invention to provide a vehicle having primary and auxiliary drive wheels, the auxiliary drive wheels being driven by a normally discontinuous drive mechanism adapted to be driven at speeds different from the primary wheels by the engine and which become drivingly engaged only when the propelling primary wheels lose a predetermined percentage of their traction.

It is a primary object of this invention to provide a vehicle having primary and auxiliary drive wheels, drive mechanism for the primary drive wheels including reduction gearing, auxiliary drive wheel drive mechanism including reduction gearing having a greater speed reduction ratio than that of the primary axle drive mechanism so that the auxiliary wheels are driven at a peripheral speed which is a predetermined fraction of the peripheral speed at which the primary drive wheels are driven and a unidirectional drive coupling in the auxiliary drive mechanism so that the auxiliary drive wheels are driven only upon loss of traction of the primary drive wheels.

Another object of this invention is to provide in a vehicle having a pair of axles, power transmitting means connecting the wheels of the respective axles to be driven by an engine at different speeds with respect to each other, the power transmitting means including a unidirectional coupling means whereby the slower driven wheels may overrun their drive from the engine.

Yet another object of the invention is to provide vehicle drive mechanism including a pair of alternatively engageable and oppositively constructed unidirectional coupling means in a vehicle power transmitting means adapted to drive the different ground engaging wheels of the vehicle at different speeds whereby the slower driven wheels may overrun their drive from the engine when the vehicle is traveling in either a forward or a reverse direction under normal traction conditions.

Still another object is to provide a vehicle having a transfer case assembly including an input shaft and a pair of output shafts connected to a pair of drive axles; and gearing in the the transfer case interconnecting the input and output shafts to rotate the output shafts at different speeds with respect to each other.

Another object of this invention is to provide a transfer case assembly including a power input shaft and a pair of power output shafts connected thereto to be driven at different relative speeds, unidirectional coupling means in the drive to the slower driven output shaft so that it may overrun its forward drive, and a means to directly couple the slower output shaft to its drive for reverse motion of the vehicle.

Another object of this invention is to provide a multi-axle vehicle drive mechanism having primary and auxiliary power output shafts driven at differential speeds and a means to disconnect a slower driven output shaft from its reduction drive gearing and for directly coupling it to the primary output shaft.

Still another object of this invention is to provide a vehicle having a pair of drive axles including differential gearing of different reduction ratios, drive means from the engine connected to rotate the power input shafts to the axles at the same speed, and a unidirectional coupling means arranged to permit the axle having the lower ratio differential to overrun the drive from the engine.

Yet another object is to provide a transfer case for use in a multi-axle driven vehicle including a pair of axially aligned output shafts and a unidirectional coupling means arranged to permit one of the output shafts to overrun the drive from the input shaft.

Another object of this invention is to provide a transfer case having a pair of axially aligned output shafts, means to drive one of the output shafts and means to couple the other output shaft to the driven output shaft including a pair of alternatively engageable and oppositively constructed unidirectional coupling means.

Another object of this invention is to provide a resilient connecting linkage between the reverse shift rail of a vehicle transmission and an axially movable coupling member of a transfer case whereby movement of the reverse shift rail is permitted regardless of resistance to movement of the coupling member.

These and other objects of this invention will become apparent as the description proceeds in connection with the accompanying drawings wherein like reference numerals have been used to designate like parts and wherein:

Figure 1 is a schematic plan view of a vehicle showing in section its transfer case and illustrating the general drive arrangement of the first three embodiments of this invention;

Figure 1A is a diagrammatic illustration of the invention applied to a tandem rear axle drive;

Figure 2 is a sectional plan view of the transfer case shown in Figure 1 constituting the first embodiment of this invention;

Figure 3 is a fragmentary sectional plan view of part of the mechanism of Figure 2 showing the reverse overrunning clutch engaged by the shift collar;

Figure 4 is a fragmentary sectional view of the forward overruning clutch taken along the line 4—4 of Figure 2;

Figure 5 is a fragmentary sectional view of the reverse overrunning clutch taken along the line 5—5 of Figure 3;

Figure 6 is a fragmentary sectional view of a modified auxiliary drive shaft drive mechanism constituting a second embodiment of this invention;

Figure 7 is a fragmentary sectional view of the mechanism of Figure 6 showing the shift collar in its position for reverse vehicle drive;

Figure 8 is a fragmentary sectional view of a further modification of the auxiliary drive shaft mechanism constituting a third embodiment of this invention;

Figure 9 is a fragmentary sectional view of the mechanism of Figure 8 showing the shift collar position when the low reverse shift rail of the vehicle transmission is in a neutral position;

Figure 10 is a fragmentary sectional view of the mechanism of Figure 8 showing the shift collar position when the vehicle transmission is in reverse;

Figure 11 is a schematic plan view of a vehicle showing further transfer case and general drive arrangements of a fourth embodiment of the invention including drive axle assemblies having differential gear mechanism of different speed reduction ratios;

Figure 12 is a fragmentary sectional view of the auxiliary drive shaft drive mechanism of the transfer case shown in Figure 11 constituting the fourth embodiment of this invention; and Figure 13 is a fragmentary sectional view of a still further modification of the auxiliary drive shaft drive mechanism constituting a fifth embodiment of this invention.

*Vehicle drive train (first, second and third embodiments)*

Referring now to the drawings, the drive mechanism for a multi-axle driven vehicle is shown schematically in Figure 1.

An internal combustion engine or other prime mover 20, which is mounted upon the vehicle frame 22 in a conventional manner, is connected to a conventional variable speed transmission unit 24 through a conventional clutch mechanism 26. The output 28 is connected to a propeller shaft 30 by a universal coupling assembly 32. Propeller shaft 30 is in turn connected through a universal coupling 34 to the power input shaft 36 of a transfer case assembly 38. Transfer case assembly 38 may be mounted on the vehicle frame 22 in any suitable manner.

Input shaft 36 is connected through suitable gearing within transfer case 38 to drive a front power output or auxiliary drive axle drive shaft 40 and a rear power output or primary drive axle drive shaft 42. The structure of the transfer case assembly 38 will be described in detail hereinafter. Front power output shaft 40 is connected to the differential drive mechanism within housing 44 of the front steer drive axle 46 through propeller shaft 48 and universal coupling assemblies 50 and 52. Rear power output shaft 42 is connected to drive the rear axle differential and axle shaft assembly within housings 54 and 56 respectively through propeller shaft 58 and the universal coupling assemblies 60 and 62.

The front or auxiliary drive axle 46 is supported by dirigible wheels 64 while the rear or primary drive axle 56 is supported by the main or primary drive wheels 66. Axles 46 and 56 support the frame 22 through suitable suspension systems (not shown). Wheels 64 and 66 are all of substantially equal diameter with the exception of the slight variations resulting from improper inflation or unequal wear of the tires.

Figure 1A illustrates the invention as applied to a six-wheel drive vehicle having a steer drive front axle 46 like Figure 1 and a tandem rear drive axle assembly consisting of wheel supported similar rear drive axles 56 and 56'. As in Figure 1 the engine 20 is connected by propeller shaft 30 into transfer case 38 which is the same as Figure 1, with a rear axle connected propeller shaft 58 and a front axle connected propeller shaft 48. Figure 1A differs over Figure 1 only in that the rear propeller shaft drive is extended as at 57 to drive not only differential 54' of the forward rear axle 56 but differential 59 of the rearward rear axle 56'. This is a conventional type drive as shown in Pringle Patent No. 2,599,013, issued June 3, 1952, and reference is made to Buckendale Patent No. 1,946,060 for a standard type of tandem axle suspension for this type of tandem axle assembly. The wheels 66 and 66' are all of the same size and adapted to be driven at the same peripheral speed as will appear.

In the first three embodiments of this invention to be described, the speed reduction between propeller shaft 48 and axle 46 due to the differential drive mechanism at 44 and the speed reduction between propeller shaft 58 and the drive axle 56 due to the differential drive mechanism at 54 are substantially equal.

*Transfer case structure*

The details of the transfer case structure of the first embodiment of this invention are shown in Figures 2 to 5 of the drawings. Referring to Figure 2, power input shaft 36 is journalled in the front and rear walls 68 and 70 of the transfer case by anti-friction bearings 72 and 74 respectively. A low ratio helical drive gear 76 is journaled by roller bearings 78 on the input shaft 36 adjacent the front wall 68, being separated from the inner race of bearing 72 by annular spacer 80. A high ratio helical drive gear 82 is journalled on input shaft 36 by roller bearings 84 adjacent the transfer case rear wall 70, being separated from the inner race of bearing 74 by an annular spacer 86.

Between gears 76 and 82, shaft 36 is formed with an enlarged externally splined portion 88 which is separated from gears 76 and 82 and from bearings 78 and 84 by annular bearing retainer rings 90 and 92 respectively. An internally splined clutch collar 94 is mounted for longitudinal sliding movement along the spline 88 of shaft 36. Collar 94 is provided at each end of its hub with exterior annular rows of spline teeth 96 and 98 while gears 76 and 82 are each provided with a flange portion adjacent collar 94 providing internal annular rows of spline teeth 100 and 102 respectively.

The peripheral extremity of a flange portion of collar 94 is operatively connected to a fork 104 which is fixed for longitudinal movement with a sliding shift rod 105. Shift rod 106, which is supported in aligned bores in front wall 68 and rear wall 70, is adapted to be shifted to one of three positions where it is held by the detent assembly indicated at 107. As shown in Figure 2, shift rod 106 is in its intermediate or neutral position wherein clutch collar 94 is disengaged. Through the longitudinal movement of shift rod 106, collar 94 may be shifted to the left so that a driving connection is established between collar 94 and gear 76 through the meshed spline teeth 96 and 100, or to the right to establish a driving connection between the collar 94 and the gear 82 through the meshed spline teeth 98 and 102, to thus couple the shaft 36 to drive either gear.

The flange portions of gears 76 and 82 are provided with external conical surfaces 108 and 110 which coact with internal conical surfaces 111 and 112 on annular members 113 and 114 respectively which are interconnected by a plurality of axially extending pins 115 that in turn are connected through resilient detent assemblies 117 to the collar 94. These mating conical surfaces coact as cone friction clutches, being adapted to be engaged by the longitudinal movement of collar 94 prior to the engagement of the corresponding annular spline teeth, thus providing a means for synchronizing the movement of the gears 76 or 82 with that of the collar 94 prior to the establishment of a positive drive connection, to avoid clashing of the clutch teeth.

A power take-off housing 116 is secured to the rear wall 70 of the transfer case by suitable means such as by machine bolts 118 and is piloted within the bore of wall 70 for bearing 74 by an annular shoulder 120.

A toothed clutch element 122, which is splined to the rear end of input shaft 36 exteriorly of bearing 74 and in abutment with the inner race thereof, is longitudinally fixed on the rear end of shaft 36 by a bolt and retainer assembly 124. A power take-off shaft 126 is journalled within housing 116 by spaced anti-friction bearings 128 and 130 in coaxial alignment with shaft 36. A second toothed clutch element 132 is slidably splined on the front extremity of the power take-off shaft 126 for longitudinal movement therealong for engagement with the mating toothed clutch element 122 on shaft 36. Clutch element 132 may be shifted from its neutral position of Figure 2 to the left into its engaged position by a conventional shifting mechanism such as that generally designated as 134.

Intermediate the bearings 128 and 130, the power take-off shaft 126 is provided with an eccentric portion 136 which acts as a cam for actuating a piston 138 of a conventional oil pump mechanism 139, the housing 140 thereof being secured to housing 116 by bolts 141. An oil line 142 extends from a lubricant sump (not shown) in the lower end of the transfer case to pump 139 for transmitting lubricant to the bearings 128 and 130.

An intermediate shaft 144 having its axis parallel to that of shaft 36 is journalled by oppositely facing tapered roller bearings 146 and 148 within the front and rear walls 68 and 70 of the transfer case. A bearing cover plate 150, which is secured to the exterior surface of the rear wall 70 by machine bolts 152, is provided with an annular shoulder 154 which extends within the bore of housing wall 70 and engages the external race of bearing 148 to prevent axial movement thereof. A pair of helical gears 156 and 158 are splined to the shaft 144 intermediate the roller bearings 146 and 148 and in abutment with the inner races thereof. A spacing collar 160 is provided between gears 156 and 158 to maintain the desired axial spacing thereof. Helical gears 156 and 158 are constantly meshed with gears 76 and 82 respectively on the input shaft 36. A spur gear 162, the purpose of which will appear presently, is splined to the shaft 144 exteriorly of the bearing 146 and in abutment with the inner race thereof. Plate 164 is secured to the end of shaft 144 by machine screws 166 in abutment with gear 162 to prevent axial movement thereof.

The rear output shaft 42, the axis of which is parallel to the axis of shafts 36 and 144, is journalled in the front wall 68 and the rear wall 70 by oppositely facing tapered roller bearings 168 and 170 respectively. A helical gear 172 is fixed for rotation with shaft 42 as by key 174 and is constantly meshed with gear 158 on the idler shaft 144.

Thus shaft 42 may be driven from input shaft 36, depending upon the longitudinal position of collar 94, either through gears 76, 156, shaft 144, gear 158, and gear 172 or through gears 82, 158, and gear 172, the former providing a lower speed ratio than the latter.

A flange member 176 forming a part of the universal coupling assembly 62 is splined to the rear extremity of the output shaft 42 outwardly of bearing 170. A brake drum 178 is secured to flange 176 in any conventional manner not shown. A conventional brake actuating mechanism 180, which is adapted to engage drum 178, is operatively mounted on a bracket 182 secured to the rear wall 70 and piloted within the bore for bearing 170 by an annular shoulder 184 to prevent axial movement of outer race of the bearing 170. As previously mentioned in connection with the description of Figure 1, propeller shaft 58 is connected to the rear output shaft 42 through the conventional universal coupling assembly 62.

The front output shaft 40 is journalled at its forward end by a ball type anti-friction bearing 186 within a cover 188 and at its rear extremity is piloted within a hollow cylindrical recess formed coaxially within the forward end of the rear output shaft 42. Cover 188, which is fixed to the exterior of the forward wall 68 of the transfer case as by bolts 190, supports bearing 186 within a bore 192 between a pair of split resilient locating rings 194. A gear 196 is mounted for free rotation on shaft 40 but is axially fixed between a pair of split resilient rings 198 on an enlarged central portion of the shaft 40. Gear 196 is constantly meshed with gear 162, which is fixed to intermediate shaft 144 as previously stated. There is a slightly greater speed reduction ratio between gears 162 and 196 than there is between gears 158 and 172, and as one example, a relative speed reduction of 1.079 to 1.000, or such that the angular velocity of gear 196 is approximately 92.6% of the angular velocity of gear 172 and output shaft 42, has been found to be quite suitable in the present invention. Gears 82 and 172 are of the same size and, if desired, shaft 126 may drive a second rear axle arranged in tandem with axle 56.

A pair of oppositely constructed unidirectional coupling means such as sprag clutches 200 and 202, which are otherwise of conventional design and comprise sprags 201 mounted in a cage 203 between shaft 40 and the clutch drums, are mounted on the enlarged portion of the front power output shaft 40 forward of gear 196. If further information is needed as to the structure of these unidirectional drive sprag clutches, reference is made to U. S. Patent No. 2,407,772. A clutch collar 204 has an internally splined portion 205 slidably connected with a row of clutch teeth 206 on a forward extension of the hub of gear 196 for longitudinal movement relative thereto. An internal row of clutch teeth 207 is formed within the collar 204 at its forward end spaced from splined portion 205, while the outer drums 208 and 209 of clutches 200 and 202 are formed with external rows of peripheral teeth 210 and 211 adapted to be selectively engaged by teeth 207 of collar 204. A fork 212 which is fixed to the shift rod 213 engages an annular groove 214 formed in the exterior of the shift collar 204 so that collar 204 may be shifted longitudinally relative to the front drive shaft 40 by movement of shift rod 213.

Shift rod 213 may be positioned either manually or automatically by a connecting linkage from the transmission unit 24 as will be explained in detail hereinafter in reference to Figure 6.

Collar 204 may be shifted to one of three positions: that shown in Figure 2 in which the internal row of teeth 207 engage the exterior teeth 210 of clutch 200 to establish a drive connection between clutch 200 and gear 196 for forward drive; that shown in Figure 3 in which teeth 207 engage teeth 211 of clutch 202 to establish a driving connection between gear 196 and clutch 202 for reverse drive; or to an intermediate position in which teeth 207 are located between and out of engagement with teeth 210 and 211. Fork 212 is constantly biased toward its forward position by a coil spring 216 compressed between it and forward wall 68. Spring 216 functions as a safety device as will become apparent presently. The flange 218 of the universal coupling assembly 52 is splined to shaft 40 and fixed by a nut 220 on the reduced threaded end section 222 of the shaft 40.

*Operation*

As previously pointed out, the intermediate shaft 144 of transfer case 38 is driven through either gears 76 and 156 or gears 82 and 158 depending upon the shifted engaged position of collar 94. Rear output shaft 42 is driven through gears 158 and 172 and in turn drives the rear axle at 56. Gear 162 drives gear 196 journalled on the front output shaft 40, and when the vehicle is traveling in a forward direction clutch collar 204 is shifted into engagement with overrunning clutch 200 as in Figure 2. Inasmuch as there is a greater reduction between gears 162 and 196 than there is between gears 158 and 172, and the wheels of the front axle are of substantially equal diameter to those of the rear axle, it is evident that under the same traction conditions for front and rear wheels the motion of the vehicle causes the front power output shaft 40 to overrun any drive tended to be imparted to it by gear 196. Gear 196 therefore cannot drive shaft 40 until the speed of shaft 40 is equal to or less than gear 196.

When the vehicle is to be driven in reverse, shift rod 213 is actuated to move clutch collar 204 into engagement with overrunning clutch 202 as is shown in Figure 3, and again the front axle will overrun the drive from gear 196 under similar traction conditions for front and rear axles. If, for either forward or reverse drive, sufficient slippage of the rear wheels 66 should occur, so that the front output shaft 40 will no longer be driven by front wheels 64 at a speed greater than that of gear 196, whichever one of the overrunning clutches 200 and 202 that is coupled will become operative automatically to establish a driving connection between gear 196 and shaft 40 to positively power drive the front wheel 64 and thereby provide a four wheel drive in the vehicle. The sprags are so located as to provide the desired direction of drive.

Where the vehicle has a tandem rear drive axle assembly as in Figure 1A, the operation is essentially the same with all of the wheels 66 and 66' of the tandem axle assembly being driven at the same peripheral speed from the rear axle drive output of the transfer case. The drive to front axle 46 is here maintained inoperative except when the wheels of the tandem drive axle assembly lose sufficient traction to slip and rotate at a peripheral speed that is a predetermined amount faster than the peripheral speed of the front wheels 64.

*Second embodiment (Figures 6 and 7)*

A second embodiment of this invention is shown in Figures 6 and 7. The structure of the second embodiment differs from that of the first only in the mechanism within the cover member 188, all other structure of the transfer case assembly 38 and of the mechanism exterior thereto being identical. Referring to Figure 6, a helical gear 300 is mounted for free rotation on a forward extension of the modified rear power output shaft 302 forward of the bearing 168. Annular spacers 304 and 306 and a resilient split ring 308 are provided to prevent axial movement of the gear 300 along the shaft 302. Gear 300 is in constant mesh with the gear 162 fixed to the forward end of the intermediate shaft 144. The front power output shaft 310 is journalled at its forward end within bearing 186 and piloted at its rear end within the cylindrical coaxial recess in the rear output 302.

A unidirectional forward overrunning clutch 312 is mounted upon an enlarged portion of shaft 310, being separated from the inner race of bearing 186 by a spacing collar 314. The outer race or drum of clutch 312 indicated at 315 has a ring of external clutch teeth 316 formed on its periphery. A clutch collar 318 having internal splines 319 is mounted for longitudinal sliding movement. Gear 300 is formed with an annular recess 320 into which the end of clutch collar 318 can be moved and with a series of clutch teeth 321 always engaged with splines 319. In Figure 6, clutch collar 318 is in its forward position with its internal splines 319 bridging teeth 316 and 321 to establish a driving connection between gear 300 and clutch outer race 315.

A clutch annulus 322, internally splined as indicated at 324, is fixed longitudinally within the clutch collar 318 between resilient split rings 326. Shaft 310 is formed with an externally splined portion 328 in constant engagement with the internal spline 324 of clutch annulus 322, which is freely rotatable relative to clutch collar 318. When collar 318 is shifted to its rearward position as shown in Figure 7, clutch annulus 322 is shifted to a position such that its internal spline teeth 324 engage external spline teeth 330 formed on the forward end of shaft 302 while remaining engaged with the spline portion 328 of shaft 310 to thus establish a direct driving connection between shaft 302 and shaft 310. Clutch collar 318 may assume a position intermediate these two extremes in which teeth 316 and 319 are disengaged and in which splines 324 and 330 are disengaged.

Means have been provided to control the shifting of clutch collar 318 from the shift mechanism of the conventional vehicle transmission 24. This means now to be described may be used in conjunction with any of the embodiments of this invention. As in the first embodiment a fork 212 is fixed to a shift rod 213, biased to its forward position by a coil spring 216, and is in engagement with an annular recess 323 formed in the exterior of the shift collar 318. A lever member 325 is fixed to the forward end of shift rod 213 at one end, and at its other end is provided with an aperture through which a rod 327 passes. A spring 329 surrounds rod 327 rearwardly of lever 325 and is held in abutment therewith by a nut 331 threaded on the end of the rod 327. A spring 332, which is relatively stronger than spring 329, surrounds rod 327 forward of lever 325 and is held in abutment therewith by a washer 334 fixed to the rod 327 by suitable means such as by welding. It is therefore apparent that rod 327 may move axially in either direction with respect to the lever, compressing either spring.

The forward extension of rod 327 is pivotally connected at 336 by a clevis 338 to a vertically extending pivot arm 340, the lower end of which is pivotally mounted at 342 on the housing of the transmission unit 24, and the upper extremity of which is connected by a pin and slot connection to a rearward extension of the conventional "low-reverse" shift rail 344 of the transmission unit 24. The shift rail 344 and the pivot arm 340 are shown in full lines in the position they assume when the shift rail 344 is in its "low" position as indicated by the letter L, this position corresponding to that of 318 in Figure 6. The neutral and reverse positions of these members are shown in phantom lines and indicated by the letters N and R respectively. The neutral position is that assumed by the shift rod 344 when the transmission unit is in its neutral condition or in any of its forward driving conditions other than low gear.

As is shown in Figure 6, when shift rod 344 is in its forward or "low" position, collar 318 establishes a driving connection between gear 300 and clutch 312. In this position, the front axle will overrun its drive under normal traction conditions for each axle because the angular velocity of shaft 310 being driven from the wheels 64 will be greater than that of gear 300. In the event of sufficient slippage of the rear wheels, clutch 312 will automatically become engaged to establish a positive power driving connection between gear 300 and shaft 310.

When the shift rail 344 is shifted to its reverse position indicated by the letter R, a direct driving connection is established by annulus 322 between rear power output shaft 302 and front power output shaft 310 as illustrated in Figure 7. In this position, the front wheels 64 will be driven at the same speed as the rear wheels 66. When the shift rail 344 is in its neutral position due to the transmission unit being in either its neutral or any of its forward speeds other than low, there is no driving connection to the front axle.

In the event that the clutch parts are not synchronized for engagement at the time of shifting, the function of the transmission unit 24 will not be retarded because compression springs 332 and 329 permit relative movement of the rod 327 and the lever 325, and when the clutch members become synchronized the compressed spring will expand and move the clutch member into engagement.

As previously indicated, spring 216 is provided as a safety means. In the event that the shifting linkage from the transmission unit 24 should become broken, collar 318 will be urged by the spring 216 to its forward position to engage the forward overruning clutch 312.

Third embodiment (Figures 8-10)

In the third embodiment of this invention, as shown in Figures 8-10, the vehicle drive mechanism, and the gearing of the transfer case is identical with that of the first two embodiments with the exception of the driving connection to the forward power output shaft of the transfer case. The forward output shaft 400 of this embodiment is journalled at its forward end within the cover member 188 by anti-friction bearing 186 and is piloted within the forward end of the rear output shaft 401, the forward end of the rear output shaft 401 being journalled within the forward wall 68 by tapered roller bearing 168 as in the previous embodiments. Drive gear 402 is mounted for free rotation on the forward output shaft 400 and constantly meshed with gear 162. Gear 402 is formed with a coaxial cylindrical recess 404 having a bottom face 405. An annular cylindrical shoulder 406 integral with the shaft 400 abuts face 405, and shoulder 406 and recess 404 serve as the races of a sprag type overrunning clutch 408 which is positioned there between as a uni-directional coupling between gear 402 and shaft 400. Clutch 408 is so constructed that gear 402 can impart only forward drive motion to the shaft 400. A collar 410 fixed to shaft 400 intermediate bearing 186 and gear 402 as by key 412, has a portion of its periphery formed with spline teeth 414, which engage internal spline teeth 416 formed within a clutch shift collar 418. Shift collar 418 is therefore connected for rotation with collar 410 and shaft 400, but is free to move longitudinally relative thereto. A peripheral row of spline teeth 420 is formed on the forward extension of the hub of gear 402. As shown in Figure 8, collar 418 is in the position it assumes when the transmission unit 24 is in "low" gear. The position of collar 418 is controlled as in the previous embodiments by a fork 212 fixed to the shift rod 213, the position of shift rod 213 being controlled either manually or automatically as described in detail in reference to the second embodiment. When the transmission unit 24 is shifted to "reverse," collar 418 will be shifted rearwardly relative to collar 410 and shaft 400 to the position shown in Figure 9 wherein the internally formed spline teeth 416 of collar 418 engage both the external teeth 414 of collar 410 and the teeth 420 on the hub of gear 402 to establish a direct driving connection between gear 402 and shaft 400 for rearward vehicle drive.

As in the previous embodiments, the shift collar 418 may assume an intermediate position when the transmission unit 24 is in neutral or in any of its forward conditions other than low. The intermediate position of collar 418 is shown in Figure 10. In reference to Figure 10, it will be noted that the internal spline teeth 416 of collar 418 do not extend to the rear end of collar 418. These teeth have been shortened so that when the collar 418 is in this intermediate position there is no engagement between the teeth 420 on the hub of gear 402 and these internal teeth 416 of collar 418. The drive connection between gear 402 and shaft 400 when collar 418 is in its neutral position is therefore the same as that when collar 418 is in the forward position, that is through the forward overrunning clutch 408.

In the operation of this embodiment of the invention, so long as normal traction of the rear drive wheels is maintained, shaft 400 will be driven by the forward wheels at speed greater than that at which the gear 402 is driven so that there will be no driving connection between gear 402 and shaft 400 through the forward overrunning clutch 408. If sufficient slippage should occur at the rear drive wheels, the angular velocity of the shaft 400 will reduce to that of the gear 402, so that a direct driving connection to the forward wheels will be automatically established from gear 402 through clutch 408 and shaft 400. When the vehicle is driven in a reverse direction, a direct driving connection to the forward axle is established from gear 402 to shaft 400.

Vehicle drive train (Embodiments 4 and 5)

Referring now to Figure 11, wherein a modified vehicle drive mechanism is shown schematically, the drive mechanism external to the transfer case 38 differs from that disclosed in Figure 1 in that the differential drive gearing 500 of the front axle assembly 46 has a greater speed reduction ratio than the differential drive gearing 502 of the rear axle 56. As thus modified, under normal traction conditions for the rear axle, the angular velocity of propeller shaft 48, being driven by the free wheeling front wheels 64, will be greater than the angular velocity of propeller shaft 58. The drive connection from the engine 20 through the clutch 26, transmission unit 24, and through the transfer case assembly 38 to the rear output shaft 42 is the same as that described in reference to Figure 1. The structure of the fourth and fifth embodiments, other than the differential gear mechanisms 500 and 502 previously mentioned and the structural modifications within the cover member 188 which are now to be described, is identical with that of the previous embodiments.

Fourth embodiment (Figure 12)

Referring to Figure 12, front power output shaft 506, the forward end of which is splined to the universal coupling assembly 52 as in the previous embodiments, is journalled adjacent its forward end within roller type anti-friction bearing 186 within the bore of the cover member 188 and at its rear end is piloted within the generally cylindrical recess formed within the forward end of the rear output shaft 504. As in the first embodiment, a pair of oppositely constructed overrunning sprag clutches 508 and 510 are mounted on an enlarged cylindrical portion 512 of the forward output shaft 506, being axially positioned thereon between an integral annular shoulder 514 on the shaft 506 and a spacing collar 516 intermediate the enlarged portion 512 of the shaft 506 and the inner race of bearing 186.

Rows of clutch teeth 517 and 518 are formed on the periphery of the outer races 519 and 520 of the clutch assemblies 508 and 510 respectively. A flange member 522 is fixed to the forward end of the rear output shaft 504, being formed with an internal spline 524 mating with external spline 526 formed on the forward extremity of shaft 504 and axially fixed thereon between a pair of split rings 528 and 530. A shift collar 532 is formed toward its rearward end with elongated internal spline teeth 534 which engage a row of external peripheral spline teeth 536 formed on flange member 522 so that rotary motion of rear output shaft 504 is transmitted directly to shift collar 532. A row of relatively short internal spline teeth is formed within collar 532 adjacent its forward end. As shown in Figure 12, these spline teeth 538 are in engagement with the external spline teeth 517 of the forward overrunning clutch outer race 519.

Shift collar 532 may be shifted by the yoke 212 in the same manner as in the previous embodiments to an intermediate position in which teeth 538 are not engaged to drive the outer race of either of the overrunning clutches, or to a rear position in which the spline teeth 538 engage the external spline teeth 518 of the rearward overrunning clutch outer race 520. In this embodiment it will be noted that due to the higher gear reduction ratio of differential mechanism 500, front power output shaft 506 will be driven by the forward wheels at an angular velocity greater than that of the rear power output shaft 504 under normal traction conditions. Should sufficient slippage occur at the rear drive wheels when the transmission unit 24 is either in low or reverse, a drive connection will become established automatically between the rear power output shaft 504 and the forward output shaft 506 to the front axle 46.

*Fifth embodiment (Figure 13)*

The details of the modification constituting the fifth embodiment of this invention is shown in Figure 13. The structure of this embodiment differs from that of the fourth embodiment solely in that a direct drive connection between the rear output shaft 504 and the forward output shaft is established for reverse drive. The forward output shaft 550 is formed with an enlarged portion 552 having a row of spline teeth 554 formed on its periphery. This integral portion 552 and spline teeth 554 have been substituted for the reverse overrunning clutch 510 and associate spline teeth 518 of the previous embodiment shown in Figure 12. When collar 532 is shifted to its rearward position as illustrated in Figure 13, a direct drive connection is established between the output shaft 504 and the forward output shaft 550.

In operation therefore, a driving connection is established to the front axle only upon sufficient slippage of the rear wheels when driving in low gear, and a direct drive connection is established to all wheels for reverse drive. When the vehicle transmission unit is in neutral or any of its forward drive conditions other than low gear, there is no driving connection to the front axle.

Five embodiments of this invention have been disclosed and described in detail.

The fundamental concept of this invention is the provision of drive trains for primary and auxiliary drive wheels by which the primary drive wheels are driven at a speed greater than the auxiliary drive wheels, here the front axle, and in which the auxiliary drive wheels may overrun their drive under normal traction conditions.

In the first three embodiments, gear sets of different speed reduction ratios are provided within the transfer case assembly to produce the speed differential between the primary drive axle drive or rear power output shaft and the auxiliary axle drive or front power output shaft. A unidirectional coupling means is provided within the transfer case assembly to permit overrunning of the forward drive by the front wheels.

In the fourth and fifth embodiments, the speed differential between the drive to the primary and auxiliary drive wheels is produced by the provision of differential gear mechanisms of different speed reduction ratios for the respective axle assemblies. A unidirectional coupling member is provided on the transfer case assembly to permit overrunning of the forward drive by the front wheels.

This invention may be embodied in specific forms other than those described in detail without departing from the spirit or essential characteristics thereof. The disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a rear drive axle and a front steer drive axle both supported by ground engaging wheels, an engine, mechanism drivingly connecting said engine to said rear axle including a first reduction gear train of a predetermined speed reduction ratio, mechanism for drivingly connecting said engine and said front axle including a second reduction gear train of a predetermined speed reduction ratio greater than that of said first reduction gear train, and means in said mechanism for drivingly connecting the engine and front axle for maintaining the driving connection between said engine and said front axle inoperative to drive said front axle except when the wheels of said rear axle lose sufficient traction to slip and rotate at a peripheral speed which is a predetermined amount faster than the peripheral speed of rotation of the wheels of said front axle in at least one direction of movement of the vehicle.

2. In a vehicle, a rear drive axle and a front steer drive axle both supported by ground engaging wheels, an engine, mechanism drivingly connecting said engine to said rear axle including a first reduction gear set of a predetermined speed reduction ration, said first reduction gear set being the pinion and ring gear of a differential gear mechanism for the rear axle mechanism for connecting said engine and said front axle including a second reduction gear set of a predetermined speed reduction ratio greater than that of said first reduction gear set, said second reduction gear set being the pinion and ring gear of a differential gear mechanism for said front axle and means in said mechanism for connecting the engine and front axle for maintaining the driving connection between said engine and said front axle inoperable to drive said front axle except when the wheels of said rear axle lose sufficient traction to slip and rotate at a peripheral speed which is a predetermined amount faster than the peripheral speed of rotation of the wheels of said front axle in at least one direction of movement of the vehicle.

3. In a motor driven vehicle, a rear drive axle having ground engaging wheels at opposite ends, means for driving said rear axle for rotating said wheels at a first peripheral speed, a front steer drive axle having ground engaging wheels at opposite ends, means adapted to drive said front axle for rotating the wheels thereof at a second peripheral speed about seven to eight per cent less than the speed of said rear axle wheels, and overrunning clutch means in said front axle driving means to permit said front axle wheels to run independently of said front axle driving means so long as the peripheral speed of said front axle wheels is greater than the peripheral speed said front axle wheels can be driven by said front axle driving means.

4. In a vehicle having a power plant, a rear drive axle having ground engaging wheels at opposite ends, a front steer drive axle having ground engaging wheels at opposite ends, and motion transmitting mechanism for driving said axles from said power plant for positively driving said rear wheels at a certain peripheral speed and at the same time adapted for positively driving said front wheels only at a predetermined corresponding lower peripheral speed, the drive to the front axle including an overrunning clutch which, when said rear wheels are driven, maintains said positive drive to said front wheels operatively disconnected as long as rotation of said front wheels due to tractional engagement with the ground is maintained greater than the corresponding lower peripheral speed.

5. In a vehicle having a power plant, a rear drive axle having ground engaging wheels at opposite ends, a front drive axle having ground engaging wheels at opposite ends, and motion transmitting mechanism for driving said axles from said power plant for positively driving said rear wheels at a certain peripheral speed and at the same time adapted for positively driving said front wheels only at a predetermined peripheral speed which is not more than seven to eight percent lower than said certain peripheral speed of the rear wheels, the drive to the front axle including an overrunning clutch which, when said rear wheels are driven, maintains said positive drive to said front wheels operatively disconnected as long as rotation of said front wheels due to tractional engagement with the ground is maintained greater than the corresponding lower peripheral speed.

6. In a vehicle having a power plant, a rear drive axle having ground engaging wheels at opposite ends, a front drive axle having ground engaging wheels at opposite ends, and motion transmitting mechanism for driving said axles from said power plant for positively driving said rear wheels at a certain peripheral speed and at the same time adapted for positively driving said front wheels only at a predetermined peripheral speed which is substantially seven to eight percent lower than said certain peripheral speed of the rear wheels, the drive to the front axle including an overrunning clutch which, when said rear wheels are driven, maintains said positive drive to said front wheels operatively disconnected as long as rotation of said front wheels due to tractional engagement with the ground is maintained greater than the corresponding lower peripheral speed.

7. In a vehicle having a power plant, a rear drive axle having ground engaging wheels at opposite ends, a front steer drive axle having ground engaging wheels at opposite ends, and gear trains for driving said axles from said power plant for positively driving said rear wheels at a certain peripheral speed and at the same time adapted for positively driving said front wheels only at a predetermined lower peripheral speed, the drive to the front axle including an overrunning clutch which, when said rear wheels are driven, maintains said positive drive to said front wheels operatively disconnected as long as rotation of said front wheels due to tractional engagement with the ground is maintained greater than the corresponding lower peripheral speed.

8. In a vehicle having a power plant, a rear drive axle having ground engaging wheels at opposite ends, a front steer drive axle having ground engaging wheels at opposite ends, and gear trains for positively driving said rear wheels from said power plant at a certain peripheral speed and at the same time adapted for positively driving said front wheels from said power plant at a predetermined lower peripheral speed, the drive to the front axle including an overrunning clutch which, when said rear wheels are driven, maintains said positive drive to said front wheels operatively disconnected except when the driven wheels of the rear axle lose sufficient traction to slip and rotate at a peripheral speed which is at least a predetermined amount faster than the peripheral speed of the front wheels at that time, and which operatively establishes said drive to the front wheels when a reduction in speed of the vehicle due to said rear wheel slippage results in sufficient reduction of the peripheral speed of said front wheels.

9. In a vehicle having a power plant, a rear drive axle having ground engaging wheels at opposite ends, a front steer drive axle having ground engaging wheels at opposite ends, and constantly meshed gear trains for driving said axles from said power plant for positively driving said rear wheels at a certain peripheral speed and at the same time adapted for positively driving said front wheels only at a predetermined lower peripheral speed, the drive to the front axle including an overrunning clutch which, when said rear wheels are driven, maintains said positive drive to said front wheels opera-tively disconnected as long as rotation of said front wheels due to tractional engagement with the ground is maintained greater than the corresponding lower peripheral speed, and which operatively connects said drive to the front axle whenever the rear wheels lose sufficient traction to slip and rotate a predetermined amount faster than the front wheels so that the peripheral speed of said front wheels is reduced to said lower peripheral speed.

10. In a vehicle, an engine, a rear drive axle and a front steer drive axle both supported by ground engaging wheels, a transfer case having an input shaft operatively connected to said engine and two output shafts connected respectively to the front and rear axles, a first reduction gear train in said transfer case interposed between said input shaft and the output shaft to the rear axle, a second reduction gear train in said transfer case interposed between said input shaft and the output shaft to said front axle, said second reduction gear train having a speed reduction ratio which is a predetermined amount greater than said first train, and an overrunning clutch in said transfer case between said second gear train and the output shaft for said front axle, said overrunning clutch maintaining the drive between the engine and front axle inoperable except when the wheels of the rear axle lost sufficient traction to slip and rotate at a peripheral speed which is a predetermined amount faster than the peripheral speed of the front axle wheels in at least one direction of movement of the vehicle.

11. In a vehicle having a power plant, tandem rear axles having ground engaging wheels at opposite ends, a front steer drive axle having ground engaging wheels at oppositie ends, means including a first gear train for driving both rear axles from said power plant at a predetermined speed reduction ratio, means including a second gear train for driving said front axle from said power plant at a predetermined speed reduction ratio greater than that of said first reduction gear train, and means in said front axle driving means for maintaining the driving connection to the front axle inoperative except when the wheels of the rear axles lose sufficient traction to slip and rotate at a peripheral speed which is a predetermined amount faster than the peripheral speed of the front wheels in either direction of movement of said vehicle.

12. In a vehicle having a power plant including a variable speed transmission having a movable low-reverse shift rail, a rear drive axle having ground engaging wheels at opposite ends, a front steer drive axle having ground engaging wheels at opposite ends, motion transmitting mechanism for driving said axles from said power plant for positively driving said rear wheels at a certain peripheral speed and at the same time adapted for positively driving said front wheels only at a predetermined corresponding lower peripheral speed, the drive to the front axle including an overrunning clutch which, when said rear wheels are driven, maintains said postive drive to said front wheels operatively disconnected as long as rotation of said front wheels due to tractional engagement with the ground is maintained greater than the corresponding lower peripheral speed, clutch control means, and means for operatively connecting said shift rail to said clutch control means.

References Cited in the file of this patent

UNITED STATES PATENTS

| | | |
|---|---|---|
| 1,219,529 | Batenburg | Mar. 20, 1917 |
| 2,107,072 | Herrington | Feb. 1, 1938 |
| 2,290,089 | Bock | July 14, 1942 |
| 2,344,388 | Bixby | Mar. 14, 1944 |
| 2,354,300 | Bock | July 25, 1944 |
| 2,399,201 | Buckendale et al. | Apr. 30, 1946 |
| 2,415,758 | Peterson et al. | Feb. 11, 1947 |
| 2,450,896 | Kimberly | Oct. 12, 1948 |